United States Patent
DeRosa et al.

(10) Patent No.: US 7,342,737 B2
(45) Date of Patent: Mar. 11, 2008

(54) OFF TRACK WRITE PROTECTION USING FILTERED POSITION ERROR SIGNAL

(75) Inventors: Jeffrey V. DeRosa, Burlington, MA (US); Orhan Beker, Worcester, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/581,911

(22) Filed: Oct. 17, 2006

(65) Prior Publication Data

US 2007/0188911 A1 Aug. 16, 2007

Related U.S. Application Data

(60) Provisional application No. 60/771,975, filed on Feb. 10, 2006.

(51) Int. Cl.
*G11B 5/596* (2006.01)
(52) U.S. Cl. .................. 360/77.08; 360/60; 360/77.02
(58) Field of Classification Search ...................... None
See application file for complete search history.

(56) References Cited

U.S. PATENT DOCUMENTS

| | | | |
|---|---|---|---|
| 6,690,534 B2 * | 2/2004 | Ding et al. ............. | 360/77.02 |
| 6,914,743 B1 * | 7/2005 | Narayana et al. ........ | 360/77.08 |
| 7,023,646 B2 * | 4/2006 | Bahirat ...................... | 360/75 |
| 7,164,550 B2 * | 1/2007 | Kisaka .................... | 360/77.04 |
| 7,206,162 B2 * | 4/2007 | Semba et al. ............. | 360/78.09 |
| 7,224,543 B1 | 5/2007 | Abrishamchian et al. | |
| 7,286,316 B2 * | 10/2007 | Sai et al. ................. | 360/77.08 |
| 2005/0264922 A1 * | 12/2005 | Erden et al. ............. | 360/78.04 |
| 2006/0103970 A1 * | 5/2006 | Kisaka .................... | 360/77.08 |
| 2007/0019321 A1 * | 1/2007 | Kim et al. ............... | 360/78.04 |

\* cited by examiner

*Primary Examiner*—Hoa T. Nguyen
*Assistant Examiner*—James L Habermehl
(74) *Attorney, Agent, or Firm*—Myers Bigel Sibley & Sajovec, PA (57) ABSTRACT

Methods of filtering a position error signal (PES) indicative of a position of a transducer of a disk drive include obtaining sample position data for the transducer, eliminating selected data of the sample position data to provide a subset of the sample position data, obtaining a plurality of sets of preliminary filter coefficients based on the subset of the sample position data, obtaining a final set of filter coefficients from the plurality of sets of preliminary filter coefficients, and filtering a position error signal using the final set of filter coefficients. Corresponding disk drives are also disclosed.

38 Claims, 8 Drawing Sheets

OFF TRACK WRITE PROTECTION USING FILTERED POSITION ERROR SIGNAL

RELATED APPLICATION

This application claims the benefit of and priority to U.S. Provisional Patent Application No. 60/771,975 titled "POSITION ERROR BASED OFF-TRACK PROTECTION ALGORITHM AND PREDICTIVE FILTER DESIGN METHODOLOGY", filed Feb. 10, 2006, the disclosure of which is hereby incorporated herein by reference as if set forth in its entirety.

FIELD OF THE INVENTION

The present invention generally relates to digital data storage devices and, more particularly, to methods, apparatus, and computer program products for reducing the occurrence of off-track writes using a filtered position error signal.

BACKGROUND

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a desired settle threshold, such as a percentage of the track width from track center. Thereafter, the servo system enters the track following mode wherein the transducer is nominally maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, the forces that can be exerted on the actuator to obtain minimum average seek times can cause vibration of the actuator and the disk drive. In particular, forces that can be exerted on the actuator can cause energy to be stored in the compliant mounting structure of the cabinet in which the disk drive is mounted. Such forces may be returned to the disk drive in the form of rotational vibration (also referred to herein as seek wind-up, which is a form of post-seek oscillation), which may cause the transducer to move away from a desired location on the disk. Rotational vibration in a disk drive may also be caused by rotation and spinning of other hard disk drives mounted in the same mounting frame.

During a track following mode, shock and/or vibration to a disk drive may result in the read/write head being moved away from a desired track. During a read operation, this may result in incorrect data being read from the disk. A more important concern, however, may be shock and/or vibration during a write operation, which may result in an off-track write. An off-track write may cause existing data to be overwritten, potentially resulting in a permanent loss of data. As the density of data storage in disk drives increases, and the track pitch (i.e. the distance between adjacent tracks) decreases, the potential for off-track writes becomes greater and greater. Accordingly, accurate control of a read-write head of a disk drive and resistance to shock and/or vibration is an important concern for disk drive design.

Efforts have been made to reduce off-track writes using signals from shock sensors mounted on the disk drive. However, such approaches may be costly and may not be effective at higher track densities.

SUMMARY

Methods of filtering a position error signal (PES) indicative of a position of a transducer of a disk drive according to some embodiments of the invention include obtaining sample position data for the transducer, eliminating selected data of the sample position data to provide a subset of the sample position data, obtaining a plurality of sets of preliminary filter coefficients based on the subset of the sample position data, obtaining a final set of filter coefficients from the plurality of sets of preliminary filter coefficients, and filtering a position error signal using the final set of filter coefficients.

Obtaining sample position data may include obtaining position data during random seek operation of the disk drive.

The methods may further include raising the sample position data to a power, such as an odd power.

The final set of filter coefficients may define a finite impulse response filter or an infinite impulse response filter.

Eliminating selected data of the sample position data may include eliminating PES data points having a value less than a first limit and/or eliminating PES data points having a value greater than a second limit.

Obtaining sample position data may include identifying one or more series of sample position data in which each data point has a value that is greater than a first limit and less than a second limit.

Obtaining a plurality of sets of preliminary filter coefficients based on the subset of the sample position data may include generating a set of preliminary filter coefficients for respective ones of the identified series of sample position data.

Generating a set of preliminary filter coefficients may include using a least squares algorithm using a respective one of the identified series of sample position data to generate a set of preliminary filter coefficients that best predicts the identified series of sample position data.

Obtaining a final set of filter coefficients from the plurality of sets of preliminary filter coefficients may include averaging the plurality of sets of preliminary filter coefficients.

The methods may further include eliminating sets of preliminary filter coefficients that include coefficients that fall outside a predetermined range prior to obtaining the final set of filter coefficients.

Obtaining sample position data and generating final filter coefficients may be performed at system start-up or shut-down of a host system including the disk drive, at regular intervals, in response to an increase in occurrence of write inhibits, in response to an occurrence of a predetermined number of write inhibits within a predetermined time interval, and/or in response to an occurrence of a predetermined aggregate number of write inhibits.

A disk drive according to some embodiments of the invention includes a head disk assembly (HDA) including a data storage disk, a transducer configured to read data from the disk and/or to write data to the data storage disk, an actuator configured to position the transducer relative to the data storage disk, and a position error sensor configured to generate a position error signal indicative of a difference between a desired position of the transducer and an actual position of the transducer relative to a track of the data storage disk. The disk drive further includes a controller that is configured to control the actuator to move the transducer to a target track during a seek operation, and that is configured to receive position error signal (PES) data indicative of a position of a transducer of a disk drive. The controller is further configured to eliminate selected data of the PES data to provide a subset of the PES data, configured to obtain a plurality of sets of preliminary filter coefficients based on the subset of the PES data, configured to obtain a final set of filter coefficients from the plurality of sets of preliminary filter coefficients, and configured to filter a position error signal using the final set of filter coefficients.

The controller may be further configured to obtain PES data during a random seek operation of the disk drive.

The controller may be further configured to raise the PES data to a power, such as an odd power, prior to obtaining the plurality of sets of preliminary filter coefficients.

The final set of filter coefficients may define a finite impulse response filter or an infinite impulse response filter.

The controller may be further configured to eliminate PES data points having a value less than a first limit and/or to eliminate PES data points having a value greater than a second limit. The controller may be further configured to identify one or more series of PES data in which each data point has a value that is greater than a first limit and less than a second limit.

The controller may be further configured to generate sets of preliminary filter coefficients for respective ones of the identified series of PES data. In particular, the controller may be further configured to generate a set of preliminary filter coefficients that best predicts the identified series of PES data using a least squares algorithm having as an input a respective one of the identified series of PES data.

The controller may be further configured to average the plurality of sets of preliminary filter coefficients to obtain the final set of filter coefficients.

The controller may be further configured to eliminate sets of preliminary filter coefficients that include coefficients that fall outside a predetermined range. The controller may be further configured to obtain the PES data and generate the final filter coefficients at system start-up or shut-down of a host system including the disk drive, at regular intervals, in response to an increase in occurrence of write inhibits, in response to an occurrence of a predetermined number of write inhibits within a predetermined time interval, and/or in response to an occurrence of a predetermined aggregate number of write inhibits.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as apparatus, methods, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described below with reference to block diagrams and/or operational illustrations of apparatus, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. The present invention may be embodied in hardware and/or in software (including firmware, resident software, micro-code, etc.). Consequently, as used herein, the term "signal" may take the form of a continuous waveform and/or discrete value(s), such as digital value(s) in a memory. Furthermore, although some of the diagrams include arrows on communication/operational paths to show a primary direction of communication/operation, it is to be understood that communication/operational may occur in the opposite direction to the depicted arrows.

Figure 1:
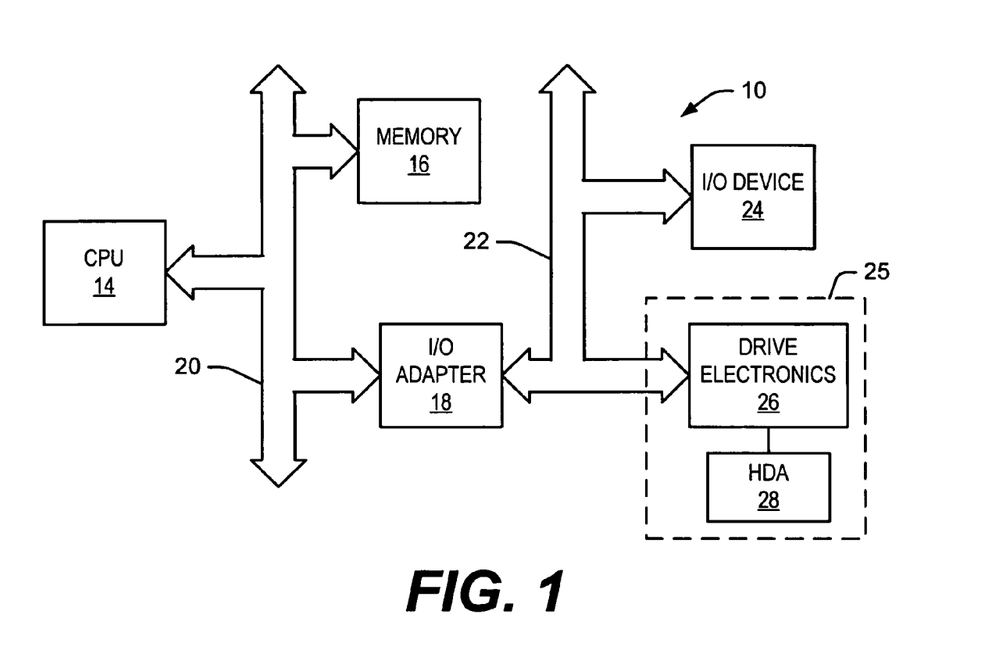
FIG. 1 is a block diagram of an exemplary computer system that includes a disk drive.

Referring to FIG. 1, an exemplary computer system 10 is shown that includes a central processing unit ("CPU") 14, a main memory 16, and an I/O (Input/Output) bus adapter 18, all interconnected by a system bus 20. Coupled to the I/O bus adapter 18 is an I/O bus 22, that may be, for example, a small computer system interconnect (SCSI) bus, firewire bus, and/or a universal serial bus. The I/O bus 22 supports various peripheral I/O devices 24 and a data storage unit such as a disk drive 25. The disk drive 25 includes drive electronics 26 and a head disk assembly 28 ("HDA").

Figure 2:
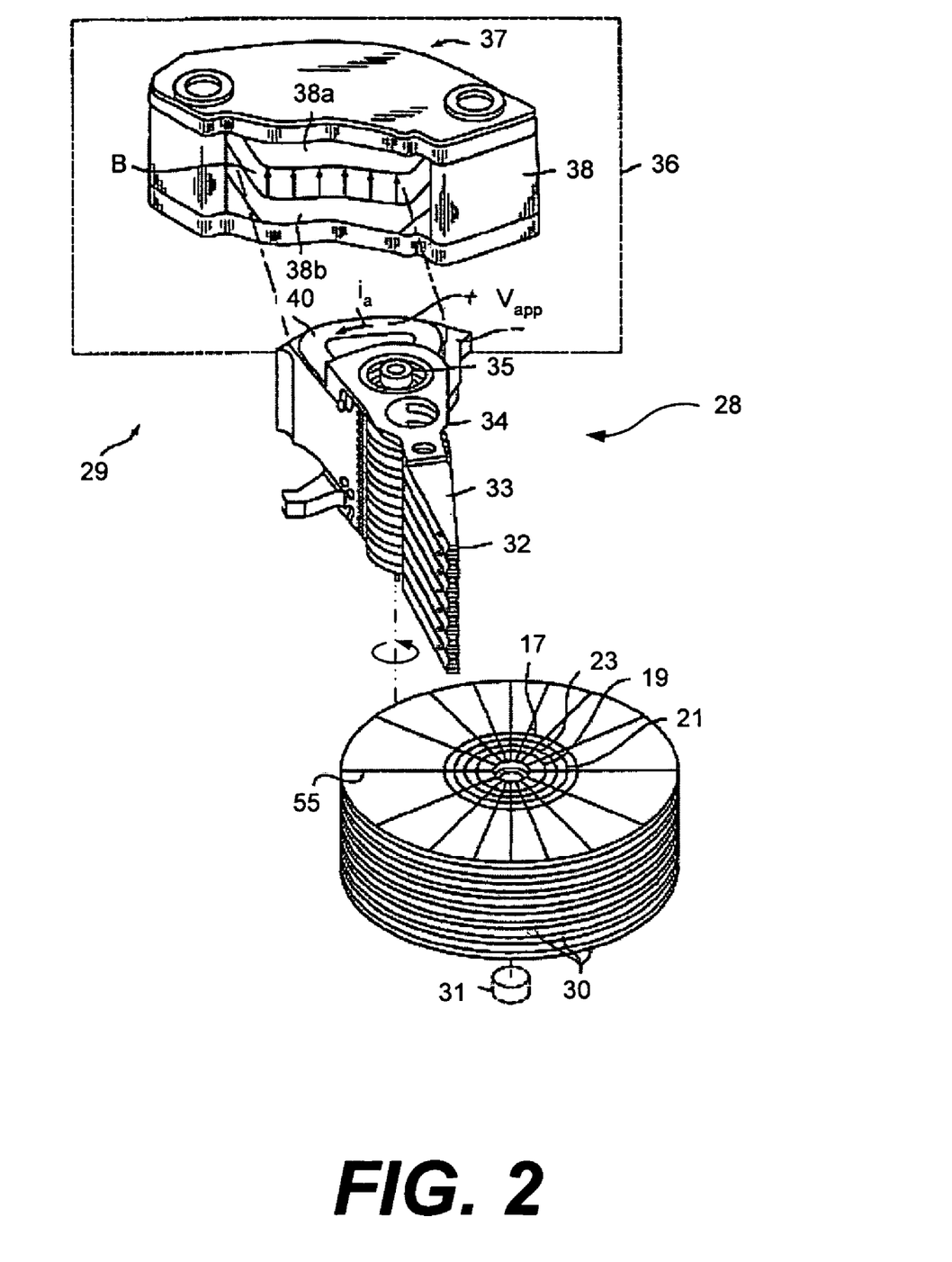
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17. The data can be written and read from the disks 30 via magnetic transducers 32 which are attached to flexible load beams 33 extending from actuator arms 34. The actuator arms 34 pivot about point 35 to move the load beams 33 in a radial direction over the storage surfaces of the disks 30, for example, from an initial track 19 towards a target track 21 shown in FIG. 2. At the target track 21, the magnetic transducers 32 can read from and/or write data on the disks 30. A motor, such as a voice coil motor (VCM) 36 controls the radial movement of the actuator arms 34 in proportion to an input actuator current $i_a$. Although the disks 30 are described as magnetic disks for purposes of illustration, the disks 30 may alternatively be optical disks or any other type of storage disk which can have data storage tracks defined on one or more storage surfaces.

The exemplary motor 36 can include a magnet 37 containing two plates 38a, 38b coupled together via a pair of sidewalls to form a flat toroidal shaped member 38. A wire coil 40 is disposed between the two plates 38a and 38b. The magnet 37 may generate a constant magnetic field B between the plates 38a and 38b. When the input actuator current $i_a$ is induced in the coil 40 disposed in the magnetic field B, a torque is produced on the actuator arms 34 resulting in radial motion of the arms 34 about pivot point 35. The polarity of the input actuator current $i_a$ determines the direction of radial motion of the actuator arms 34.

As noted above, as the transducers 32 approach the target track 21, the servo system initiates a settle mode to bring the transducers 32 to rest over the target track 21 within a desired settle threshold. The time required for the transducers 32 to come to rest over the destination track may be referred to as the "settle time" or "settle period."

Figure 3:
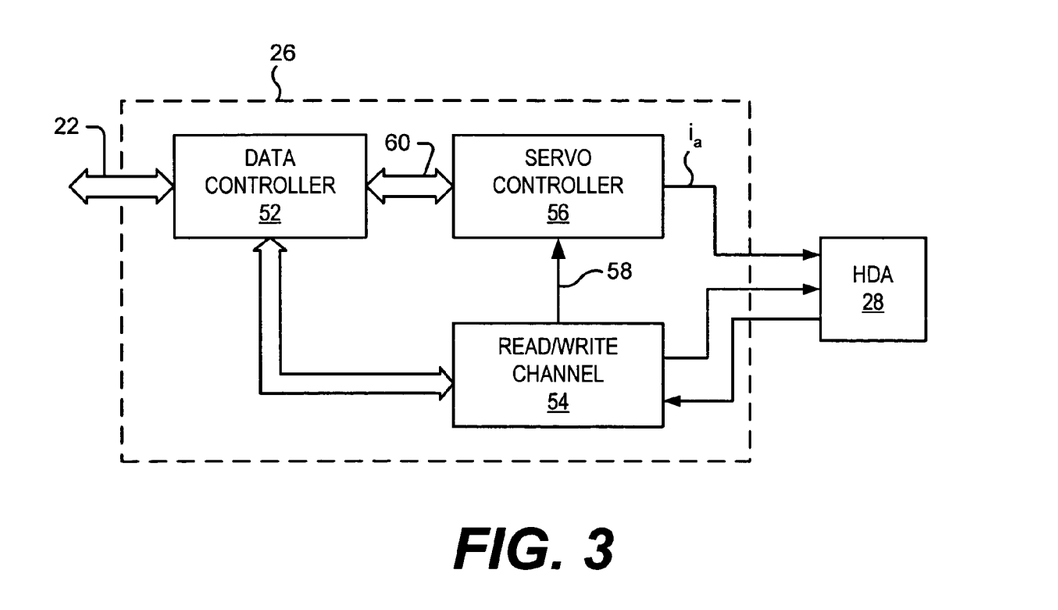
FIG. 3 is a block diagram of the drive electronics of the disk drive according to some embodiments of the present invention.

Referring to FIG. 3, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54. The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducers 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a multiplicity of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducers 32 in relation to that track and data block within the track. The transducer location information is induced into the transducers 32, converted from analog signals to digital data in the read/write channel 54, and transferred to the servo controller 56. The servo controller 56 can use the transducer location information for performing seek and tracking operations of the transducers 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command that is converted into the input actuator current $i_a$, and provided to the actuator 29 to radially move the transducers 32 across the disk 30. The seek time is thereby dependent on the magnitude of the current command. The energy imparted by the actuator arms 34 to the housing (which is later returned to the drive 25 as rotational vibration) is also dependent on the magnitude of the current command.

Figure 4:
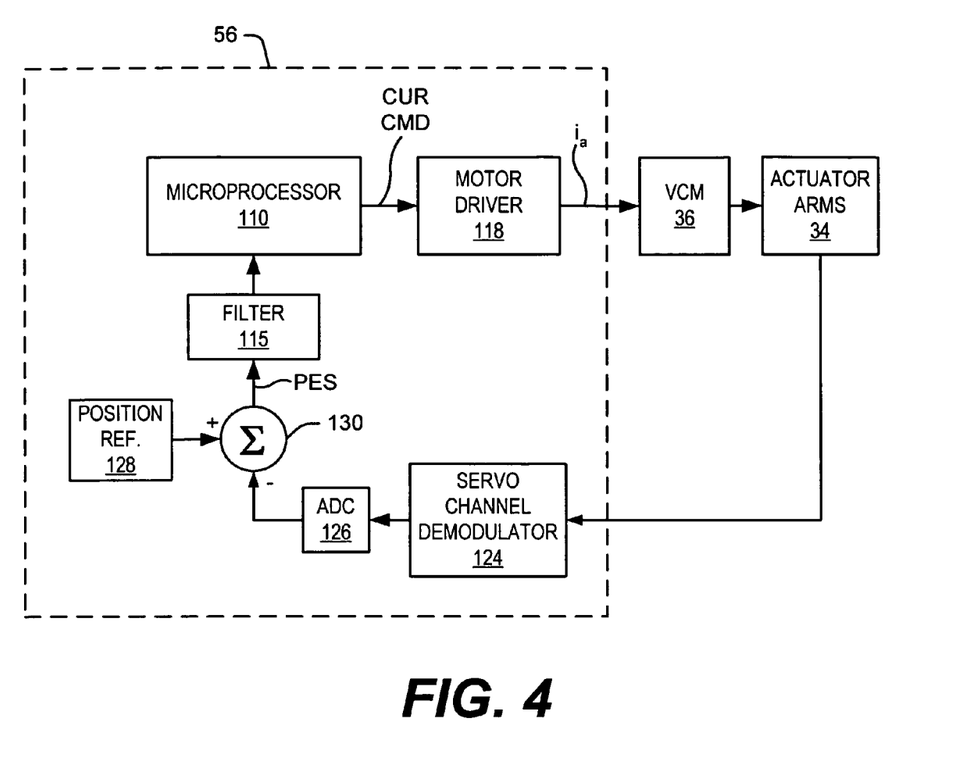
FIG. 4 is a block diagram of a servo controller according to some embodiments of the present invention.

FIG. 4 is a block diagram of a servo controller 56 illustrating systems and/or methods according to some embodiments of the invention. As shown therein, a servo controller 56 includes a controller 110 which is configured to generate a current command signal CUR CMD which is provided to a motor driver circuit 118. The motor driver circuit 118 converts the current command into an input actuator current signal $i_a$, which is provided to the voice coil motor VCM 36. As discussed above, the motor 36 moves the actuator arms 34 in response to the input actuator current signal $i_a$. A servo channel demodulator 124 generates a servo signal that is proportional to the position of the actuator arms 34. The servo signal is digitized by an analog to digital converter 126 and subtracted at a summing node 130 from a position reference signal generated by a position reference generator 128. Accordingly, the servo channel demodulator 124, the analog to digital converter 126, the position reference generator 128 and the summing node 130 form a position error sensor that is configured to generate a position error signal (PES) indicative of a difference between a desired position of the transducers 32 and an actual position of the transducers 32 relative to a track of the data storage disk 30.

The position error signal is then filtered by a filter 115, and the filtered position error signal is provided to the controller 110, which uses the filtered PES to control the current command, to thereby adjust the position of the transducers 32 relative to the target track 21. Filtering of the PES permits the controller to make more accurate decisions as to the actual location of the transducers 32. That is, the filter predicts an actual PES based on a PES signal, which includes an error component. Thus, design of the filter 115 may have a significant effect on the performance of the servo controller 56.

The filter 115 may be a digital or analog filter. In particular, the filter 115 may be a finite impulse response (FIR) digital filter or an infinite impulse response (IIR) filter. A finite impulse response filter may be easily implemented as a transversal filter, the design of which is known to those skilled in the art. When the filter 115 is implemented as a digital FIR filter, the filter coefficients may be determined by analyzing a series of position error data collected from an operating disk drive. An algorithm, such as a least squares algorithm, may be used to find a filter that provides the best prediction for the data series.

Figure 5:
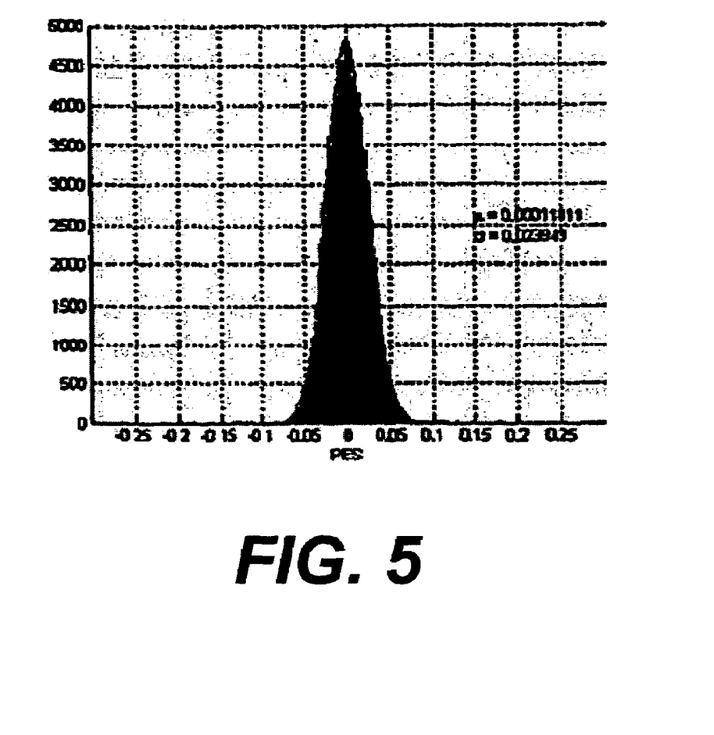
FIG. 5 is a histogram showing a distribution of various levels of PES for data collected from a disk drive in steady state operation.
Figure 6:
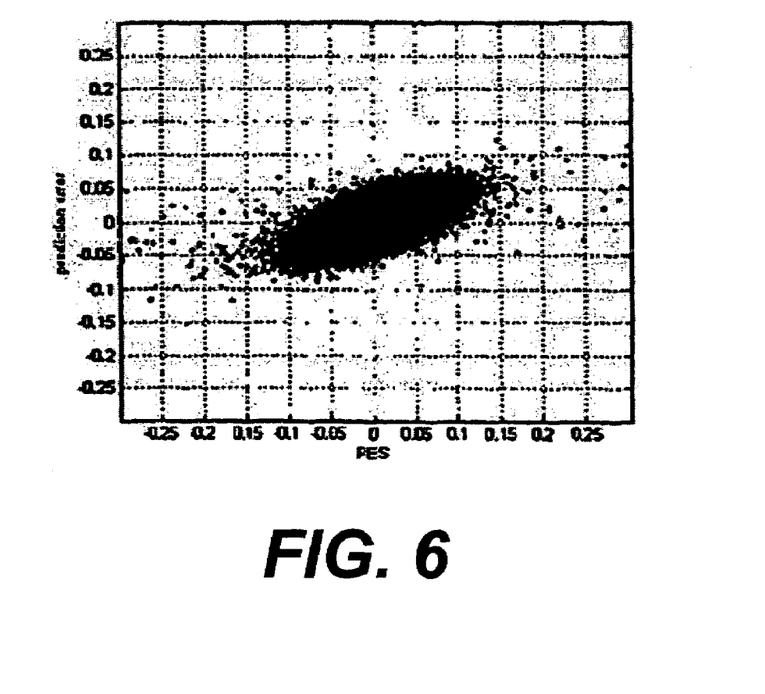
FIG. 6 is a graph of prediction error versus PES during steady state operation for a large number of PES measurements.

FIG. 5 is a histogram showing a distribution of various levels of PES for data collected from a disk drive in steady state operation, and FIG. 6 is a graph of prediction error versus PES during steady state operation for a large number of PES measurements. As shown in FIG. 5, the mean PES is very close to zero, while the standard deviation is about 0.024 tracks. Typically, an off-track write does not occur unless the PES is greater than about 0.16 tracks. In a typical disk drive, writing is inhibited when the PES signal exceeds a threshold that is defined with reference to the PES at which off-track write occurs. Thus, as seen in FIG. 5, most of the PES measurements in a typical steady state disk operation are well within a range in which off-track writes are not expected to occur.

Figure 7:
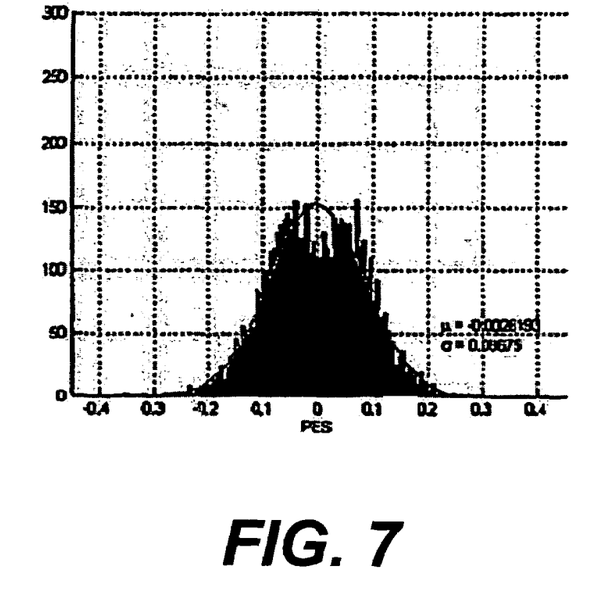
FIG. 7 is a histogram showing a distribution of various levels of PES for a disk drive during random seek operation.
Figure 8:
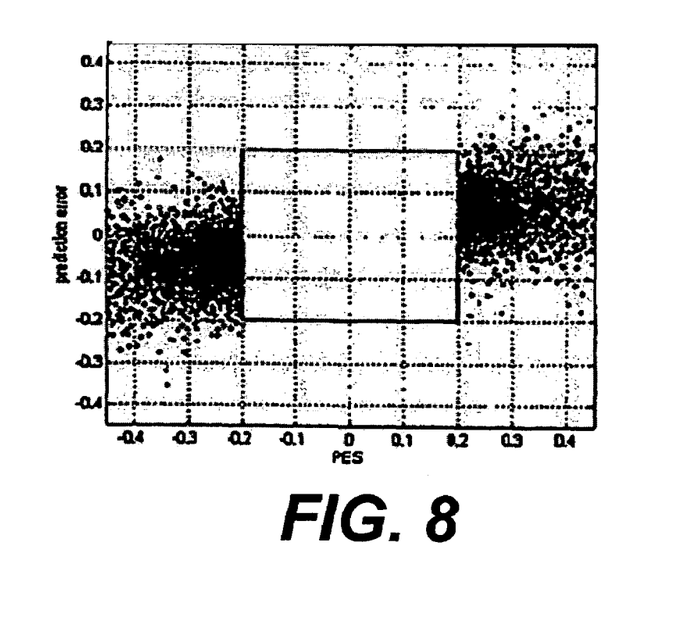
FIG. 8 is a graph of prediction error versus PES during random seek operation using a filter designed using PES data.

FIG. 7 is a histogram showing a distribution of various levels of PES for a disk drive during random seek operation, and FIG. 8 is a graph of prediction error versus PES during random seek operation using a filter designed using PES data. The data shown in FIG. 8 show a skew that indicates that the prediction error increases as PES increases. This is an undesirable behavior, and is an indication of overprotection that may result in unnecessary write inhibits that may lead to performance degradation.

The "black box" in FIG. 8 represents a range of PES that may be ignored, since it is too low to be likely to cause a write inhibit. Thus, according to some embodiments of the invention, filter design (i.e. selection of filter coefficients) may be performed based on a subset of PES data. In particular, filter design may be performed using only PES data series in which the PES is above a first limit and lower than a second limit. For example, filter design may be performed using only PES data series in which the PES is greater than 0.2 tracks and less than 0.45 tracks. PES data lower than the first limit is excluded because when the PES is low, there is a lower probability of an off-track write occurring. Thus, according to some embodiments of the invention, the filter design does not take into account the data associated with low PES. Likewise, PES data above the second threshold may be ignored in the filter design, since a PES above a certain threshold will typically result in a write inhibit.

Stated differently, during normal on-track operation, PES signals tend to say close to zero, as the transducers 32 stay close to the center of the tracks. However, during a settle period, or when a shock is received, the PES signal increases in magnitude, which poses a greater danger of an off-track write occurring. According to some embodiments of the invention, a filter design is made in response to PES signals that represent a transducer position that is farther away from the center of the track than is typically encountered in normal on-track operation.

Figure 9:
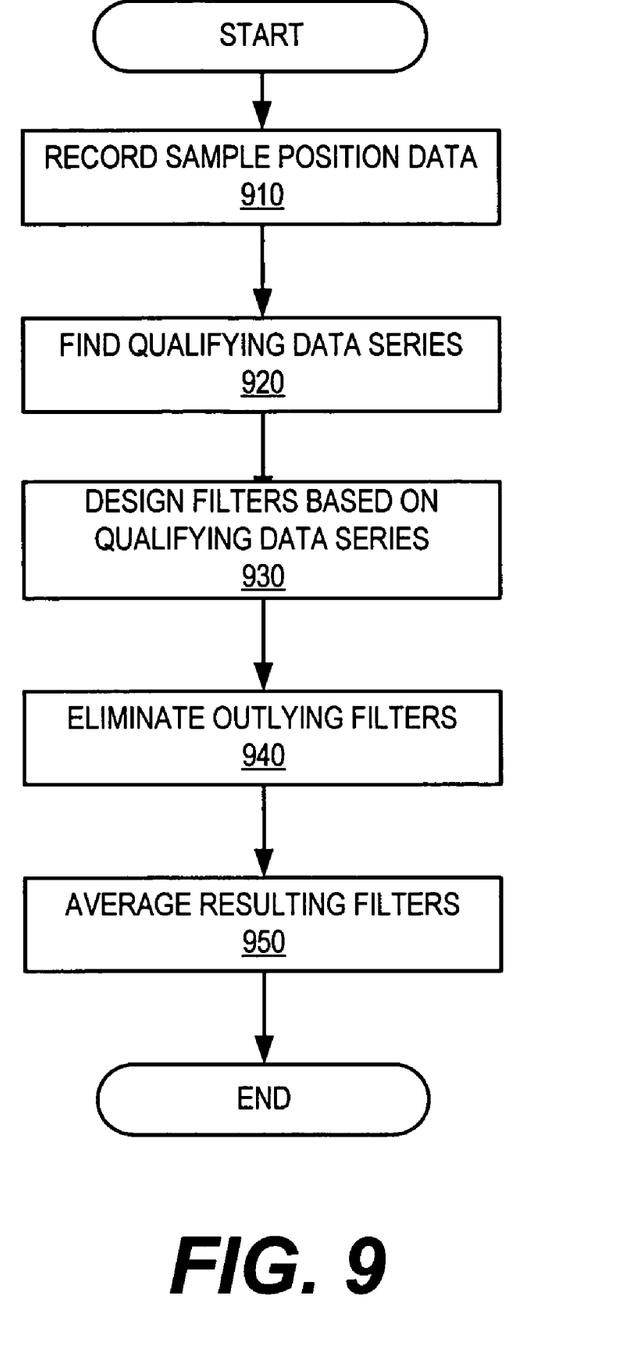
FIG. 9 is a flowchart showing operations associated with filter design according to some embodiments of the invention.

Methods according to embodiments of the invention are illustrated in FIG. 9. As shown therein, sample PES data is collected and recorded during random seeks (Block 910). Data may be collected in an actual operational environment and/or in an environment designed to provide shock and/or vibration similar to that which may be expected during normal operation.

The collected PES data is filtered to remove data for which the PES is either less than a first limit (e.g. 0.2 tracks) or greater than a second limit (e.g. 0.45 tracks) (Block 920). One or more continuous series of data falling within the first and second limits (a "qualifying data series") is then extracted and each series is provided as an input to an algorithm, such as a least squares algorithm, that determines a filter than provides the best estimate for the data series (Block 930). This process is repeated for each of the qualifying data series. Thus, for example, N qualifying data series extracted from a PES data sample will result in N filter designs.

In some embodiments, the PES may be raised to an odd power to preserve the sign of the PES data while enhancing the effect of large PES errors compared to smaller errors. Raising the PES to an odd power may be performed instead of or in addition to excluding small values of PES from the filter design algorithm. In either case, the importance of larger PES values in the filter design algorithm is enhanced while the importance of small PES values is diminished.

Any potential outlier filter designs may be eliminated (Block 940). That is, depending on the size of the qualifying data series used in the filter design, some individual filter designs may be outliers within the overall collection of filters. Such filters may be eliminated, for example, by eliminating any filter having a coefficient that lies outside a mean filter coefficient value (plus or minus some number of standard deviations).

A final filter design may be obtained by averaging the remaining filter designs after eliminating the outlying filters (Block 950).

The write inhibit threshold may be selected based on the error of the estimate provided by the final filter, which will depend on the behavior of the drive PES.

Figure 10:
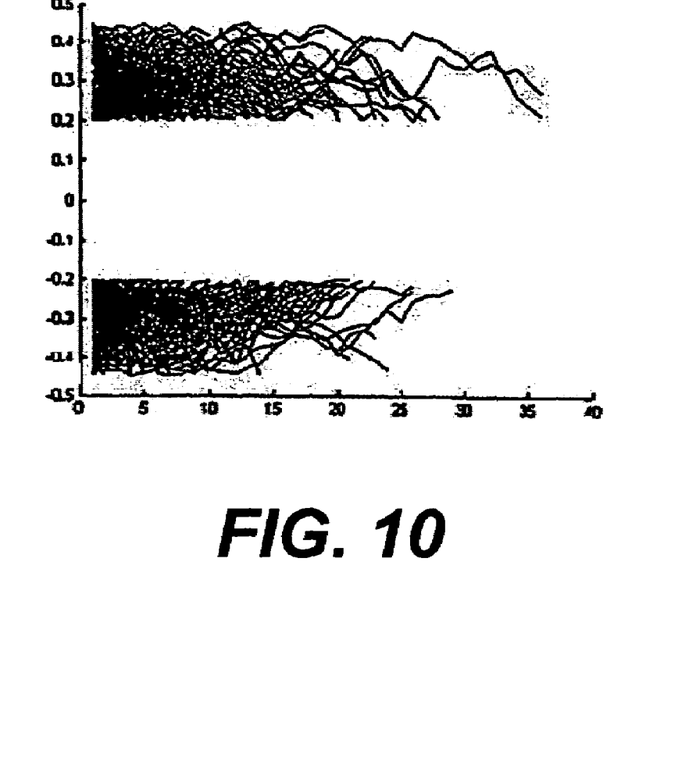
FIG. 10 is a graph of a number of PES data series from PES data collected from an operating disk drive.

FIG. 10 is a graph of a number of qualifying PES data series from PES data collected from an operating disk drive in which all PES data in the series falls-between the first and second limits. In particular, in the graph of FIG. 10, all PES data in each of the traces shown in the graph is greater than 0.2 tracks and less than 0.45 tracks. Each trace may be used as an input to a filter design algorithm, such as a least squares algorithm, to obtain filter coefficients that provide an optimum prediction for the trace. The resulting sets of filter coefficients may then be averaged to provide a final filter design for the PES filter 115.

Figure 11:
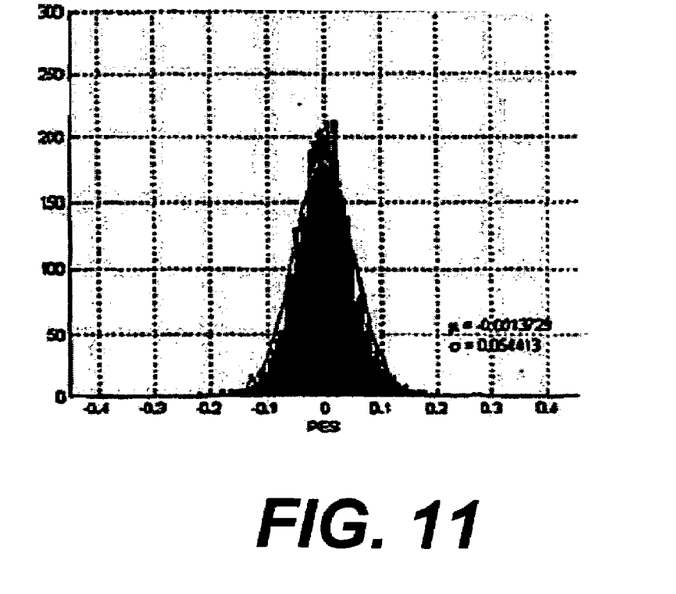
FIG. 11 is a graph of prediction error versus PES during random seek operation using a filter designed according to embodiments of the invention.
Figure 12:
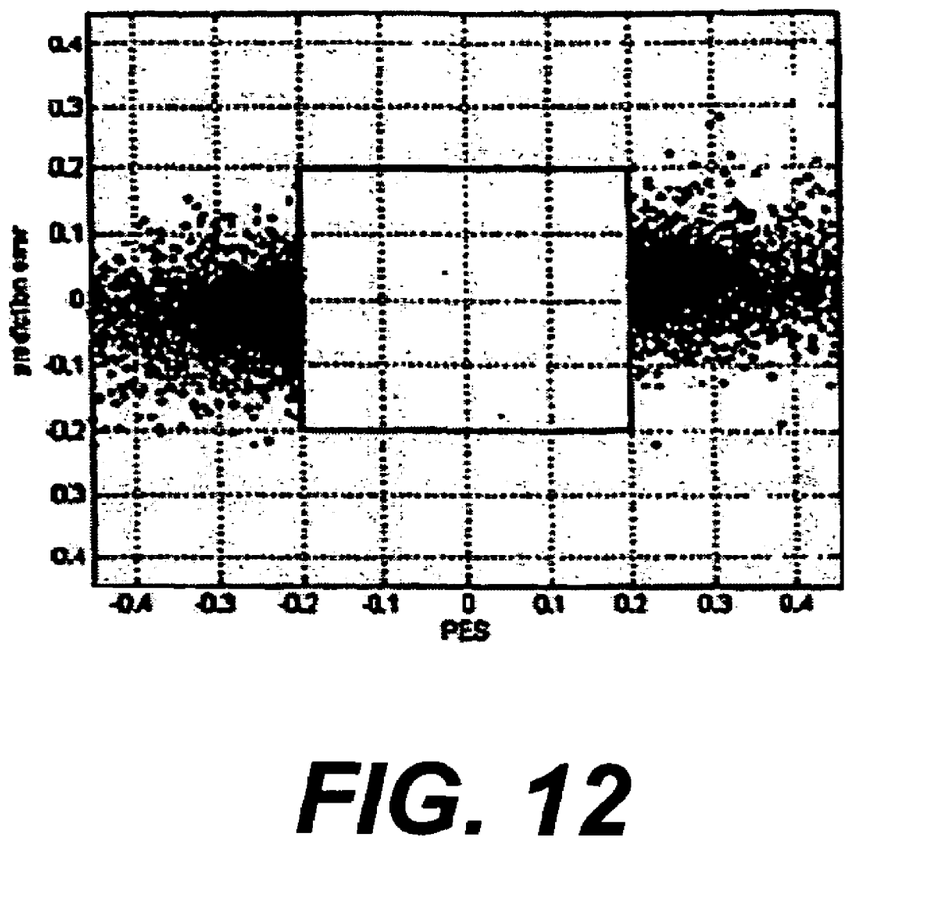
FIG. 12 is a graph of prediction error versus PES during random seek operation using a filter designed using a subset of PES data according to some embodiments of the invention.

FIGS. 11-12 illustrate a filter design methodology according to embodiments of the invention. In particular, FIG. 11 is a graph of prediction error versus PES during random seek operation using a filter designed according to embodiments of the invention. As can be seen by comparing FIG. 11 to FIG. 7, the standard deviation of PES values may be reduced when only a subset of PES data is used in filter design. Similarly, FIG. 12 is a graph of prediction error versus PES during random seek operation using a filter designed using a subset of PES data according to some embodiments of the invention. As can be seen from FIG. 12, the skew of the data points in the plot is reduced compared with that of FIG. 8, which indicates better estimation when the transducer 32 is away from the center of the track. Accordingly, a filter design according to some embodiments of the invention may increase the accuracy of the filter's prediction, which may result in more reliable predictions of off-track conditions. More reliable predictions of off-track conditions may result in fewer unnecessary write inhibits, which may improve device performance. Moreover, better estimates of off track predictions may lead to fewer off track writes and increased system reliability and/or data integrity.

Some embodiments of the invention may provide an easily tunable algorithm for designing a PES filter that may be useful for reducing off-track writes. Furthermore, an algorithm according to embodiments of the invention may be performed multiple times during the lifetime of a disk drive. For example, a filter selection algorithm could be performed each time a system starts up or shuts down, or during idle operation. The filter selection algorithm could be performed at random intervals and/or at regular intervals, such as after a set number of hours of operation. The filter selection algorithm could also be performed in response to an increase in the occurrence of write inhibits, or based on the occurrence of a certain number of write of write inhibits within a given time, or after an aggregate number of write inhibits has occurred. The filter selection algorithm may also be performed in response to a user or programmatic command.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of filtering a position error signal (PES) indicative of a position of a transducer of a disk drive, comprising:
    obtaining sample position data for the transducer;
    eliminating selected data of the sample position data to provide a subset of the sample position data;
    obtaining a plurality of sets of preliminary filter coefficients based on the subset of the sample position data;
    obtaining a final set of filter coefficients from the plurality of sets of preliminary filter coefficients; and
    filtering a position error signal using the final set of filter coefficients.

2. The method of claim 1, wherein obtaining sample position data comprises obtaining position data during random seek operation of the disk drive.

3. The method of claim 1, further comprising raising the sample position data to a power.

4. The method of claim 3, wherein the power is an odd power.

5. The method of claim 1, wherein the final set of filter coefficients defines a finite impulse response filter.

6. The method of claim 1, wherein the final set of filter coefficients defines an infinite impulse response filter.

7. The method of claim 1, wherein eliminating selected data of the sample position data comprises eliminating PES data points having a value less than a first limit.

8. The method of claim 1, wherein eliminating selected data of the sample position data comprises eliminating PES data points having a value greater than a second limit.

9. The method of claim 1, wherein eliminating selected data of the sample position data comprises eliminating PES data points having a value less than a first limit and greater than a second limit.

10. The method of claim 1, wherein obtaining sample position data comprises identifying one or more series of sample position data in which each data point has a value that is greater than a first limit and less than a second limit.

11. The method of claim 10, wherein obtaining a plurality of sets of preliminary filter coefficients based on the subset of the sample position data comprises generating a set of preliminary filter coefficients for respective ones of the identified series of sample position data.

12. The method of claim 11, wherein generating a set of preliminary filter coefficients comprises using a least squares algorithm using a respective one of the identified series of sample position data to generate a set of preliminary filter coefficients that best predicts the identified series of sample position data.

13. The method of claim 1, wherein obtaining a final set of filter coefficients from the plurality of sets of preliminary filter coefficients comprises averaging the plurality of sets of preliminary filter coefficients.

14. The method of claim 1, further comprising eliminating sets of preliminary filter coefficients that include coefficients that fall outside a predetermined range prior to obtaining the final set of filter coefficients.

15. The method of claim 1, wherein obtaining sample position data and generating final filter coefficients is performed at system start-up or shut-down of a host system including the disk drive.

16. The method of claim 1, wherein obtaining sample position data and generating final filter coefficients is performed at regular intervals.

17. The method of claim 1, wherein obtaining sample position data and generating final filter coefficients is performed in response to an increase in occurrence of write inhibits.

18. The method of claim 1, wherein obtaining sample position data and generating final filter coefficients is performed in response to an occurrence of a predetermined number of write inhibits within a predetermined time interval.

19. The method of claim 1, wherein obtaining sample position data and generating final filter coefficients is performed in response to an occurrence of a predetermined aggregate number of write inhibits.

20. A disk drive comprising:
    a head disk assembly (HDA) including a data storage disk, a transducer configured to read data from the data storage disk and/or to write data to the data storage disk, and an actuator configured to position the transducer relative to the data storage disk;
    a position error sensor configured to generate a position error signal indicative of a difference between a desired position of the transducer and an actual position of the transducer relative to a track of the data storage disk;

a controller that is configured to control the actuator to move the transducer to a target track during a seek operation, configured to receive position error signal (PES) data indicative of a position of a transducer of a disk drive; configured to eliminate selected data of the PES data to provide a subset of the PES data; configured to obtain a plurality of sets of preliminary filter coefficients based on the subset of the PES data; configured to obtain a final set of filter coefficients from the plurality of sets of preliminary filter coefficients; and configured to filter a position error signal using the final set of filter coefficients.

21. The disk drive of claim 20, wherein the controller is further configured to obtain PES data during random seek operation of the disk drive.

22. The disk drive of claim 20, wherein the controller is further configured to raise the PES data to a power prior to obtaining the plurality of sets of preliminary filter coefficients.

23. The disk drive of claim 22, wherein the power is an odd power.

24. The disk drive of claim 20, wherein the final set of filter coefficients defines a finite impulse response filter.

25. The disk drive of claim 20, wherein the final set of filter coefficients defines an infinite impulse response filter.

26. The disk drive of claim 20, wherein the controller is further configured to eliminate PES data points having a value less than a first limit.

27. The disk drive of claim 20, wherein the controller is further configured to eliminate PES data points having a value greater than a second limit.

28. The disk drive of claim 20, wherein the controller is further configured to eliminate PES data points having a value less than a first limit and greater than a second limit.

29. The disk drive of claim 20, wherein the controller is further configured to identify one or more series of PES data in which each data point has a value that is greater than a first limit and less than a second limit.

30. The disk drive of claim 29, wherein the controller is further configured to generate sets of preliminary filter coefficients for respective ones of the identified series of PES data.

31. The disk drive of claim 30, wherein the controller is further configured to generate a set of preliminary filter coefficients that best predicts the identified series of PES data using a least squares algorithm having as an input a respective one of the identified series of PES data.

32. The disk drive of claim 20, wherein the controller is further configured to average the plurality of sets of preliminary filter coefficients to obtain the final set of filter coefficients.

33. The disk drive of claim 20, wherein the controller is further configured to eliminate sets of preliminary filter coefficients that include coefficients that fall outside a predetermined range.

34. The disk drive of claim 20, wherein the controller is configured to obtain the PES data and generate the final filter coefficients at system start-up or shut-down of a host system including the disk drive.

35. The disk drive of claim 20, wherein the controller is configured to obtain the PES data and generate the final filter coefficients at regular intervals.

36. The disk drive of claim 20, wherein the controller is configured to obtain the PES data and generate the final filter coefficients in response to an increase in occurrence of write inhibits.

37. The disk drive of claim 20, wherein the controller is configured to obtain the PES data and generate the final filter coefficients in response to an occurrence of a predetermined number of write inhibits within a predetermined time interval.

38. The disk drive of claim 20, wherein the controller is configured to obtain the PES data and generate the final filter coefficients in response to an occurrence of a predetermined aggregate number of write inhibits.

* * * * *